April 22, 1958 W. H. BLISS 2,832,044

ELECTRONIC INTERVAL TIMERS

Filed Oct. 29, 1949

Inventor
WARREN H. BLISS

By

Attorney 2,832,044
Patented Apr. 22, 1958

2,832,044

ELECTRONIC INTERVAL TIMERS

Warren H. Bliss, Princeton, N. J., assignor to Radio Corporation of America, a corporation of Delaware Application October 29, 1949, Serial No. 124,460

5 Claims. (Cl. 324—68)

Figure 1:
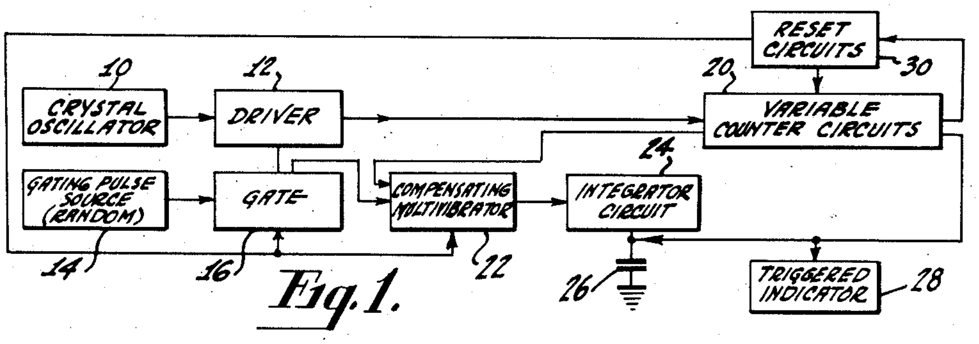

This invention relates to measuring systems, and more particularly to an improvement in electronic interval timers.

A system for accurately timing an interval by electronic means, which is commonly used, is one wherein the number of cycles delivered by a constantly running reference oscillator during an interval being timed is counted. Usually, a gating pulse opens a gate at the beginning of such an interval, thus permitting the delivery of the oscillation cycles to a counting chain which counts the number of cycles occurring during the interval being timed. Alternatively, the counter may be preset to count a given number of cycles whose total duration is equivalent to the interval whose duration is sought. In either case, the end of the interval is signified by some type of indicator which is triggered by a pulse supplied by the counter.

For extremely accurate interval timing, however, such as is required in the calibration of radar systems, prior art systems, such as the one generally described above, are not sufficiently precise. The gating pulse, which opens the path from the reference oscillator to the counting chain, is usually not synchronized to occur at the beginning or the end of the first cycle from the reference oscillator to be counted but has a random occurrence within the period of the cycle. This leads to an inaccuracy in the timing of an interval which may be as great as ±½ counting cycle.

It is therefore an object of my present invention to provide a system for making electronic interval timers more accurate than heretofore.

It is a further object of my invention to provide a system for eliminating the error caused in an electronic interval timer by the random occurrence of a gating pulse within the period of a cycle being counted.

These and further objects are achieved by impressing a pulse simultaneously with the gating pulse upon a compensating multivibrator of the double stability type, causing it to asume the first of its two stable conditions. This causes an integrating circuit which is coupled to the multivibrator to become conductive. The integrating circuit consists of a vacuum tube with a storage condenser in series with its cathode. The storage condenser begins to charge up until, upon the occurrence of a second counting cycle from the reference oscillator, a second pulse is applied to the compensating multivibrator, which causes it to assume the second of its two stable conditions, whereupon the charging of the storage condenser by the integrating circuit is stopped. At the termination of the interval being timed, the counter generates a termination pulse. This is applied to the storage condenser where it is superposed on the voltage previously stored and charges up the condenser still further. The storage condenser is also connected to an indicating device which can be triggered, such as a thyratron or a blocking oscillator and whose output may be used to indicate the end of the count or of the interval being timed.

Since the termination pulse does not have a purely rectangular waveform, but its leading edge, in view of the charging of the storage condenser, is actually at an acute angle with its base, the addition of the termination pulse to the voltage on the storage condenser triggers the indicator at some point along this leading edge which occurs sooner or later, depending upon the amplitude of the voltage already present on the storage condenser. Since the first stored voltage is proportional in amplitude to the time it takes for the second cycle to occur at the reference oscillator, after the occurrence of the gating pulse, the voltage to which the storage condenser is charged is dependent upon the time of the occurrence of the gating pulse within the duration of the first cycle. Therefore, since the precise time of the triggering of the indicator is dependent upon the amplitude of the voltage present on the storage condenser, a correction factor is applied to the time of triggering which eliminates any error due to random phase relation between the gating pulse and the first cycle to be counted.

Figure 2:
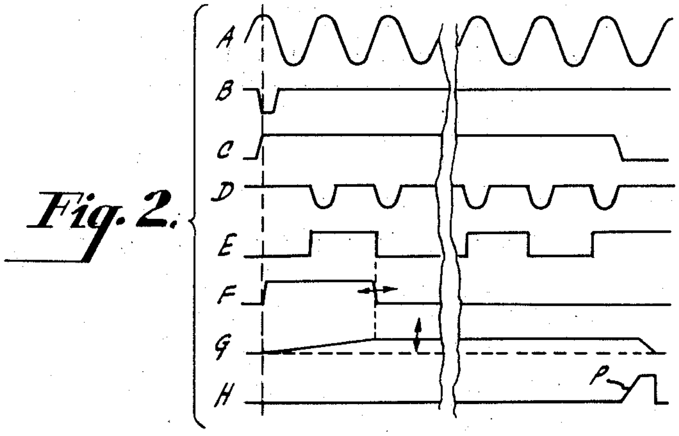
Figure 3:
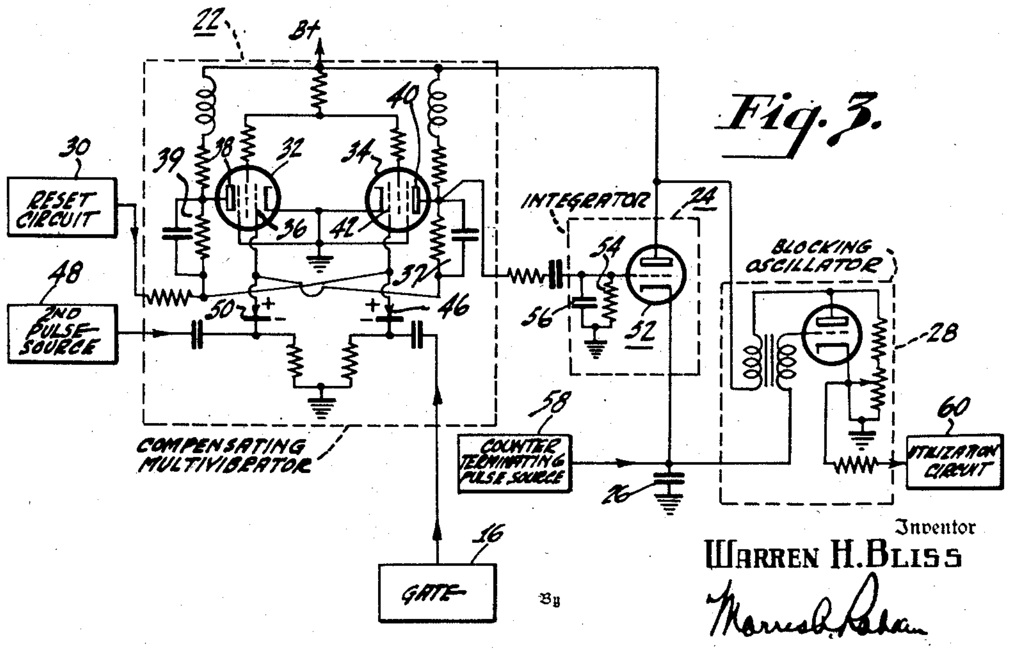

The novel features of the invention, both as to its organization and method of operation, as well as additional objects and advantages thereof, will best be understood from the following description when read in connection with the accompanying drawing, in which:

Figure 1 is a block diagram of an electronic interval counter which embodies my invention, Figure 2 is a diagram of voltage waveforms and is referred to hereinafter in explaining my invention, and Figure 3 is a circuit diagram of a presently preferred embodiment of my invention.

Referring, now, to Figure 1, a continuously running reference oscillator 10, which may be crystal controlled, oscillates at a frequency which is usually selected on the basis of requirements of the units to be measured. The cycles of reference oscillations from the oscillator are applied to a driver stage 12 which is normally maintained at cut-off so that no signal is passed by it.

In order to open the driver stage 12, a gating pulse is applied from a gating pulse source 14 to a gate 16. This gate may be, for example, a multivibrator of the double stability type which is caused to assume one stable state by the application of a first pulse and a second stable state by the application of a second pulse. The gating pulse causes the gate to bias the driver stage so that it can pass oscillation cycles to the variable counter circuits 20. The gate 16 holds the driver stage 12 open until, at the conclusion of the count or the interval being timed, a second pulse is applied to the gate 16 which causes it to close the driver stage.

The counter circuits 20 comprise a plurality of counter stages the number of which is determined by the size of the count or interval desired to be timed. Any of the electronic counter circuits which are well known to the art may be used to count the cycles of the reference oscillator and deliver a terminating pulse at the termination of the counting interval. Examples of counters which may be used are described in the commonly owned, copending applications Serial No. 749,849, filed May 22, 1947, now U. S. Patent 2,604,263, and Serial No. 16,835, filed March 24, 1948, now U. S. Patent 2,560,968, both for "Variable Frequency Counter" and both by Olin Lowe MacSorley.

The pulse from the gate 16, which opens the driver stage 12, is also applied to the input of a compensating multivibrator 22 of the double stability type. This compensating multivibrator 22 may be of the same type as the gating stage 16. The pulse applied to the compensating multivibrator 22 causes it to assume the first of its two stable conditions. The compensating multivibrator output is coupled to an integrator circuit 24 which includes a vacuum tube with a storage capacitor 26 in series with its cathode. An output from the compensating multivibrator 22 is applied to the vacuum tube and causes it to commence to charge the storage capacitor 26. When the driver stage 12 produces a second cycle of oscillation, after being opened by the gate 16, a second pulse is fed to the input of the compensating multivibrator which causes it to assume the second of its two stable conditions. This action, applied to the vacuum tube in the integrator network 24, causes it to cease charging the condenser.

This second pulse which is applied to the compensating multivibrator is derived from a stage of the variable counter circuit 20 which first responds to the application of the second cycle of oscillation to the variable counter circuit input. If the variable counter 20 is one of the commonly known multivibrator chains, the input to the second multivibrator in the first chain may be used to provide this pulse. In many cases, it is desirable to reduce the frequency of the crystal oscillator before it is applied to the counter chain. One or two multivibrator stages are usually used. If one multivibrator stage is used, then the input to the counters may be used to provide the second pulse. If two multivibrator stages are used, then the input to the second multivibrator stage may be used to provide the second pulse. The coupling to the compensating multivibrator 22, for the purpose of applying the second pulse, is made through a rectifier so that it is only tripped once. Subsequent pulses from the second pulse source do not affect its second stable condition since the compensating multivibrator is already in the condition to which it would be driven by those subsequent pulses.

The voltage placed upon the storage condenser 26 has an amplitude which is directly dependent upon the length of time it is being charged. Since this period is for the interval between the arrival of the gating pulse and the occurrence of the second counted cycle from the oscillator 10, the amplitude of the voltage stored varies directly with the random phase variation of the gating pulse with the cycle produced by the oscillator at the time of the gating pulse arrival. This voltage is stored on the condenser until the termination of the interval being timed, at which time the termination pulse, which is delivered by the counter circuits 20, is added to the voltage previously placed on the storage condenser 26. The storage condenser 26 is also connected to the input to a triggered indicator 28, which may be the grid of a blocking oscillator or a thyratron tube.

Since the terminating pulse effectively charges the storage condenser to a higher voltage, the leading edge of the pulse is not rectangular. The triggered indicator 28 is fired when the voltage applied to its input from the storage condenser 26 reaches a predetermined level. The time required for the terminating pulse to attain this level is dependent upon the amplitude of the voltage previously stored on the condenser which, as shown above, is dependent upon the duration of the first cycle out of the oscillator after the gating pulse. If the gating pulse arrives near the end of the first cycle, the voltage stored on the condenser is small and the firing of the triggered indicator is therefore delayed for a longer time until the storage condenser is charged up to triggering potential by the termination pulse. If the gating pulse arrives near the beginning of the first cycle, the voltage stored on the condenser is large and the triggered indicator is fired after only a small delay.

At the conclusion of its count, or immediately thereafter, the variable counter circuits 20 generate a reset pulse. This is applied to a reset circuit 30, which may be an amplification and isolation stage, or a voltage accumulator stage, which applies the reset pulse to the various counter stages to reset them to their initial counting position. The reset circuit output is also applied to the gate 16 to close it and thus stop further oscillation cycles from passing through the driver 12. A portion of the reset circuit output may also be applied to the compensating multivibrator 22 to make sure that it is in such condition that, upon receiving an output from the gate 16, it assumes the condition wherein it biases the integrator circuit into charging the storage condenser.

Referring to Figure 2, the waveshape of the oscillator output voltage is represented as curve "A." The gating pulse is represented as curve "B." The waveshape of the output voltage of the gate which is applied to the driver stage 12 is represented as curve "C." The output of the driver stage 12 is represented as curve "D." Due to the gating pulse being first applied to the gate stage, there is a slight time lag before the driver stage opens to pass the first cycle from the oscillator. This is due to the gating stage circuit, is very slight, and is a constant depending upon the gating stage circuit and components. Since this delay is always constant, it may be readily compensated for elsewhere in the circuit. Curve "E" represents pulses from the second pulse source. These are applied to the compensating multivibrator through a differentiating network so that, upon the occurrence of the second cycle from the driver stage, a negative pulse, caused by the differentation of the negative going trailing edge of the first pulse from the second pulse source, trips the compensating multivibrator and causes it to terminate the charging of the storage condenser. The output from the compensating multivibrator is represented as curve "F" and is shown as a substantially rectangular pulse having a variable trailing edge. The waveshape of the voltage to which the storage condenser 26 is charged and which is stored thereon is represented by curve "G." The terminating pulse which is applied to the storage condenser is represented by curve "H." A point "P," shown on the leading edge of curve "H," represents the voltage amplitude at which the triggered indicator is fired. It will be seen readily that if curves "G" and "H" are added, the time at which the point "P" is reached depends upon the amplitude of the voltage represented by curve "G." Since the voltage amplitude required to fire a triggered indicator can always be preset, and since the terminating pulse waveshape is constant, the time required to fire the triggered indicator is dependent upon the amplitude of the voltage represented by waveshape "G."

Figure 3 is a circuit diagram of a preferred embodiment of my invention. The compensating multivibrator 22 includes two vacuum tubes 32, 34. The grid 36 of the first of the tubes 32, is connected to the plate 40 of the second of the tubes 34, through a parallel resistor-condenser combination 37. The grid 42 of the second of the tubes 34 is likewise connected to the plate 38 of the first of the tubes through a parallel resistor-condenser combination 39. The output of the gating stage 16 is coupled to the grid 42 of the second tube 34 of the compensating multivibrator through a crystal rectifier 46. The output from the reset circuit 30 is connected to this grid also, but between the crystal rectifier 46 and the grid 42. A second pulse source 48, wherein the second pulse may be derived from the variable counter circuits 20 as described above, is coupled to the grid 36 of the first tube 32 of the compensating multivibrator 22 through a crystal rectifier 50. Proper electrode voltages for the two tubes are supplied from a B+ source.

The anode 40 of the second tube 34 of the compensating multivibrator 22 is coupled to the grid of an integrator tube 52 of the integrator network 24. The values of the parallel resistor 54 and condenser 56 which couple the grid of the integrator tube 52 to ground are chosen so that a positive pulse (as represented by curve "F" in Figure 2) applied from the compensating multivibrator 22 causes the tube 52 to conduct and thus charge up the storage condenser 26, which is in series with the cathode of the tube 52, for as long as the positive pulse is applied to its grid.

The source 58 of the counter terminating pulse, which may include the variable counter circuits 20 and reset circuits 30 as described above, is coupled to the storage condenser 26. The storage condenser is also coupled to the grid of the blocking oscillator 28. The voltage required for triggering the blocking oscillator is predetermined by the potentiometer in its cathode circuit. When the blocking oscillator 28 is fired, its grid becomes conducting and thus discharges the storage condenser. The output of the blocking oscillator may be applied to a utilization circuit 60 for any desired use.

From the foregoing description, it will be readily apparent that I have provided an improved system or apparatus for compensating for the random arrival of a gating pulse within the duration of a cycle of oscillation in an interval timer. Although I have shown and described but a single embodiment of my present invention, it should be apparent that many changes may be made in the particular embodiment herein disclosed and that many other embodiments are possible, all within the spirit and scope of my invention. Therefore, I desire that the foregoing description shall be taken as illustrative and not as limiting.

What is claimed is:

1. In an interval timer of the type wherein a gate is opened by a gating pulse to allow a counting chain to count the oscillation cycles supplied by a continuously running reference oscillator during an interval being timed and wherein a terminating voltage pulse is supplied by said counting chain at the end of said interval which terminating pulse triggers an indicator, the combination therewith of means to compensate for random phase relations between said gating pulse and the first counted oscillation cycle comprising means to generate a voltage having an amplitude dependent upon the phase difference between said gating pulse and the first of said counted oscillator cycles, means to combine said terminating voltage pulse with said generated voltage, and means to excite said indicator with said combined voltages whereby the time of exciting said indicator is compensated for random phase relations between said gating pulse and said first counted oscillation cycle.

2. In an interval timer of the type wherein a gate is opened by a gating pulse to allow a counting chain to count the oscillation cycles supplied by a continuously running reference oscillator during an interval being timed and wherein, at the end of said interval, a terminating voltage pulse is generated by said counting chain which triggers an indicating device, the combination therewith of means to compensate for random phase relations between said gating pulse and the first counted oscillation cycle comprising a storage condenser coupled to said indicating device, means to charge said storage condenser to a voltage having an amplitude dependent upon the phase difference between said gating pulse and said first counted oscillator cycle, means to impress said terminating voltage pulse upon said storage condenser to combine said terminating voltage pulse with said stored voltage to trigger said indicating device at a time which is compensated for random phase relations between said gating pulse and said first counted oscillation cycle.

3. The combination recited in claim 1 wherein said means to generate a voltage having an amplitude dependent upon the phase relation between said gating pulse and the first of said oscillator cycles to be counted comprises a multivibrator of the type that assumes a first condition in response to a first applied pulse and a second condition in response to a second applied pulse, means to apply said gating pulse to said multivibrator to cause it to assume a first condition, integrating network means including a storage condenser coupled to said multivibrator for charging said storage condenser in response to said multivibrator being in said first condition, and means to apply a second pulse to said multivibrator to cause it to assume its second condition at a time occurring a given number of said oscillation cycles after said gating pulse.

4. In an interval timer of the type wherein a gate is opened by a gating pulse to allow a counting chain to count the oscillation cycles supplied by a continuously running reference oscillator during an interval being timed and wherein, at the end of said interval being timed, a terminating voltage pulse is generated by said counting chain which excites a blocking oscillator, the combination therewith of means to compensate for the random phase relation between said gating pulse and the first of said oscillation cycles to be counted comprising a multivibrator of the type that assumes a first condition in response to a first pulse and a second condition in response to a second pulse, a storage condenser coupled to said blocking oscillator, means to charge said storage condenser when said multivibrator is in said first condition including an electron discharge tube having anode, grid and cathode electrodes, said grid being coupled to said multivibrator, and said storage condenser being in series with said cathode, means to impress said gating pulse upon said multivibrator to cause it to assume said first condition, means to impress a second pulse upon said multivibrator to cause it to assume said second condition at a time occurring a given number of said oscillator cycles after said gating pulse, and means to impress said terminating voltage pulse upon said storage condenser to combine it with the voltage stored on said storage condenser and to thereby excite said blocking oscillator at a time which is compensated for any random phase relation between said gating pulse and said first of said oscillation cycles to be counted.

5. In an interval timing system wherein a gate is opened by a gating pulse to allow a counting chain to count the oscillation cycles supplied by a continuously running reference oscillator during an interval being timed and at the end of said interval a terminating voltage pulse is generated by said counting chain which terminating pulse triggers an indicator, the method of compensating for random phase relation between said gating pulse and the first oscillation cycle counted comprising the steps of generating a voltage having an amplitude proportional to the phase difference between said gating pulse and said first counted oscillation cycle, storing said generated voltage, adding said terminating voltage pulse to said stored voltage, and exciting said oscillator with the resultant of said added voltages whereby the instant at which said indicator is triggered is corrected for any random phase relation between said gating pulse and said first oscillator cycle.

References Cited in the file of this patent

UNITED STATES PATENTS

| | | |
|---|---|---|
| 2,414,107 | Kenyon | Jan. 14, 1947 |
| 2,490,500 | Young | Dec. 6, 1949 |